United States Patent
Sotani

(10) Patent No.: US 8,820,290 B2
(45) Date of Patent: Sep. 2, 2014

(54) INTERNAL COMBUSTION ENGINE

(75) Inventor: Hiroshi Sotani, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 489 days.

(21) Appl. No.: 12/882,558

(22) Filed: Sep. 15, 2010

(65) Prior Publication Data

US 2011/0073066 A1 Mar. 31, 2011

(30) Foreign Application Priority Data

Sep. 29, 2009 (JP) ................. 2009-225477

(51) Int. Cl.
*B60K 11/02* (2006.01)
*B60K 11/04* (2006.01)
*G01F 23/04* (2006.01)
*F01M 11/04* (2006.01)

(52) U.S. Cl.
CPC ............. *B60K 11/02* (2013.01); *B60K 11/04* (2013.01); *G01F 23/04* (2013.01); *F01M 11/04* (2013.01)
USPC ........ 123/196 R; 123/198 R; 33/725; 33/722; 33/727; 33/730; 33/713; 184/109

(58) Field of Classification Search
CPC ........ B60K 11/02; B60K 11/04; G01F 23/04; F16L 3/26; F01M 11/04; F02B 77/00
USPC .............. 33/713–731; 123/196 R, 198 R; 237/12.1, 12.3 R, 12.3 B, 12.4, 12.7
See application file for complete search history.

(56) References Cited

U.S. PATENT DOCUMENTS

| | | | | |
|---|---|---|---|---|
| 1,436,580 A | * | 11/1922 | Dillard | 165/134.1 |
| 1,809,528 A | * | 6/1931 | Patten | 237/12.3 B |
| 2,757,647 A | * | 8/1956 | Kishline | 33/727 |
| 3,001,517 A | * | 9/1961 | Baker et al. | 123/41.47 |
| 4,331,185 A | * | 5/1982 | Rinaldo et al. | 141/95 |
| 5,456,295 A | * | 10/1995 | Taylor et al. | 141/5 |
| 5,499,690 A | * | 3/1996 | Shearn et al. | 180/68.4 |
| 6,394,059 B2 | * | 5/2002 | Guzman | 123/195 R |
| 6,637,539 B2 | * | 10/2003 | Rioux et al. | 180/339 |
| 7,389,763 B2 | * | 6/2008 | Kochi et al. | 123/200 |
| 2005/0067548 A1 | * | 3/2005 | Inoue | 248/635 |
| 2009/0243376 A1 | * | 10/2009 | Tahara et al. | 303/3 |

FOREIGN PATENT DOCUMENTS

JP  2550859 Y  10/1997

* cited by examiner

*Primary Examiner* — Lindsay Low
*Assistant Examiner* — Kevin Lathers
(74) *Attorney, Agent, or Firm* — Birch, Stewart, Kolasch & Birch, LLP

(57) ABSTRACT

An internal combustion engine includes: an engine body including: a crankcase for rotatably supporting a crankshaft; and a crankcase cover fastened to the crankcase by a plurality of bolts so as to cover one side of the crankcase; and a stay supporting an oil level gauge guide, the stay being mounted on the engine body, the stay having an opening receiving and supporting a tube or wire.

20 Claims, 4 Drawing Sheets

INTERNAL COMBUSTION ENGINE

CROSS-REFERENCE TO RELATED APPLICATIONS

This nonprovisional application claims priority under 35 U.S.C. §119(a) on Patent Application No. 2009-225477, filed in Japan on Sep. 29, 2009, the entirety of which is incorporated herein by reference.

BACKGROUND OF THE INVENTION

1. Field of the Invention

The present invention relates to an internal combustion engine, and more particularly to an internal combustion engine having an engine body including a crankcase for rotatably supporting a crankshaft and a crankcase cover fastened to the crankcase by plural bolts so as to cover one side of the crankcase, wherein a stay for supporting an oil level gauge guide is mounted on the engine body.

2. Background of the Invention

Japanese Utility Model Registration No. 2550859 discloses a structure that a stay for supporting an oil level gauge guide is fixed by a bolt to the outer side surface of a belt cover for covering a belt for transmitting the power from a crankshaft to a generator.

In general, a tube for circulating cooling water for an internal combustion engine is arranged on the periphery of the oil level gauge guide. Further, a wire or the like is also arranged on the periphery of the oil level gauge guide. There is a need to support such a tube or wire in the middle thereof. However, in the case that any dedicated parts for supporting the tube or wire are provided, the parts count is increased.

SUMMARY OF THE INVENTION

It is accordingly an object of the present invention to provide an internal combustion engine which can support a tube or wire by using a stay for supporting an oil level gauge guide, thereby reducing a parts count.

In accordance with a first aspect of the present invention, there is provided an internal combustion engine having an engine body including: a crankcase for rotatably supporting a crankshaft; and a crankcase cover fastened to the crankcase by a plurality of bolts so as to cover one side of the crankcase; and a stay supporting an oil level gauge guide, the stay being mounted on the engine body, the stay having an opening receiving and supporting a tube or wire.

In accordance with a second aspect of the present invention, the stay is mounted to the crankcase and the crankcase cover by utilizing at least two bolts of the plural bolts.

In accordance with a third aspect of the present invention, the at least two bolts for fastening the stay are arranged adjacent to each other in a vertical direction.

In accordance with a fourth aspect of the present invention, the oil level gauge guide extends at a position substantially corresponding to a joint surface between the crankcase cover and the crankcase.

In accordance with a fifth aspect of the present invention, the oil level gauge guide is provided on the crankcase cover.

In accordance with a sixth aspect of the present invention, a radiator is located on the front side of the engine body so that the axis of the crankshaft extends in the longitudinal direction of a vehicle including the internal combustion engine; a support portion forming at least a part of the stay and extending in a plane perpendicular to the longitudinal direction of the vehicle is formed with the opening oriented in the longitudinal direction of the vehicle; and the tube extending in the longitudinal direction of the vehicle so as to send a cooling water to the radiator is inserted through and supported by the opening.

In accordance with a seventh aspect of the present invention, the oil level gauge guide is provided on the crankcase cover constituting a part of the front surface of the engine body; and a thermostat is provided at the rear portion of the engine body, wherein one end of the tube is connected to the thermostat.

According to the first aspect of the present invention, the stay is formed with the opening for insertion and support of a tube or wire. Accordingly, any dedicated supporting member for supporting a tube or wire is not required, thereby reducing the parts count.

According to the second aspect of the present invention, the stay is mounted to the crankcase and the crankcase cover by utilizing at least two bolts for mounting the crankcase cover to the crankcase. Accordingly, any dedicated bolts for mounting the stay are not required, thereby reducing the parts count and manufacturing cost. Further, the stay can be mounted to the crankcase and the crankcase cover without an increase in weight. In addition, since the stay is mounted by using at least two bolts, a supporting strength for the stay can be sufficiently ensured.

According to the third aspect of the present invention, the at least two bolts for fastening the stay are arranged adjacent to each other in the vertical direction. Accordingly, the stay can be arranged so as to extend in the vertical direction and a sufficient supporting strength for the stay can be ensured. As a result, the oil level gauge guide extending in the vertical direction can be easily supported by the stay.

According to the fourth aspect of the present invention, the oil level gauge guide extends at a position substantially corresponding to the joint surface between the crankcase cover and the crankcase. Accordingly, the oil level gauge guide can be located near the stay mounted to the crankcase and the crankcase cover.

According to the fifth aspect of the present invention, the oil level gauge guide is provided on the crankcase cover. Accordingly, the stay mounted to the crankcase cover and the crankcase can be lapped over the oil level gauge guide in the axial direction of the crankshaft, and the stay can be formed as a flat member.

According to the sixth aspect of the present invention, the support portion forming at least a part of the stay and extending in a plane perpendicular to the longitudinal direction of the vehicle is formed with the opening oriented in the longitudinal direction of the vehicle, and the tube for sending a cooling water to the radiator located on the front side of the engine body is inserted through the opening of the stay. Accordingly, any dedicated parts for supporting the tube are not required, thereby reducing the parts count, and the tube can be efficiently supported.

According to the seventh aspect of the present invention, the oil level gauge guide is provided on the crankcase cover constituting a part of the front surface of the engine body, and the thermostat is provided at the rear portion of the engine body. One end of the tube is connected to the thermostat and the other end is connected to the radiator. The tube is inserted through the opening of the stay supporting the oil level gauge guide. Accordingly, the tube minimized in length can be efficiently supported by the stay.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
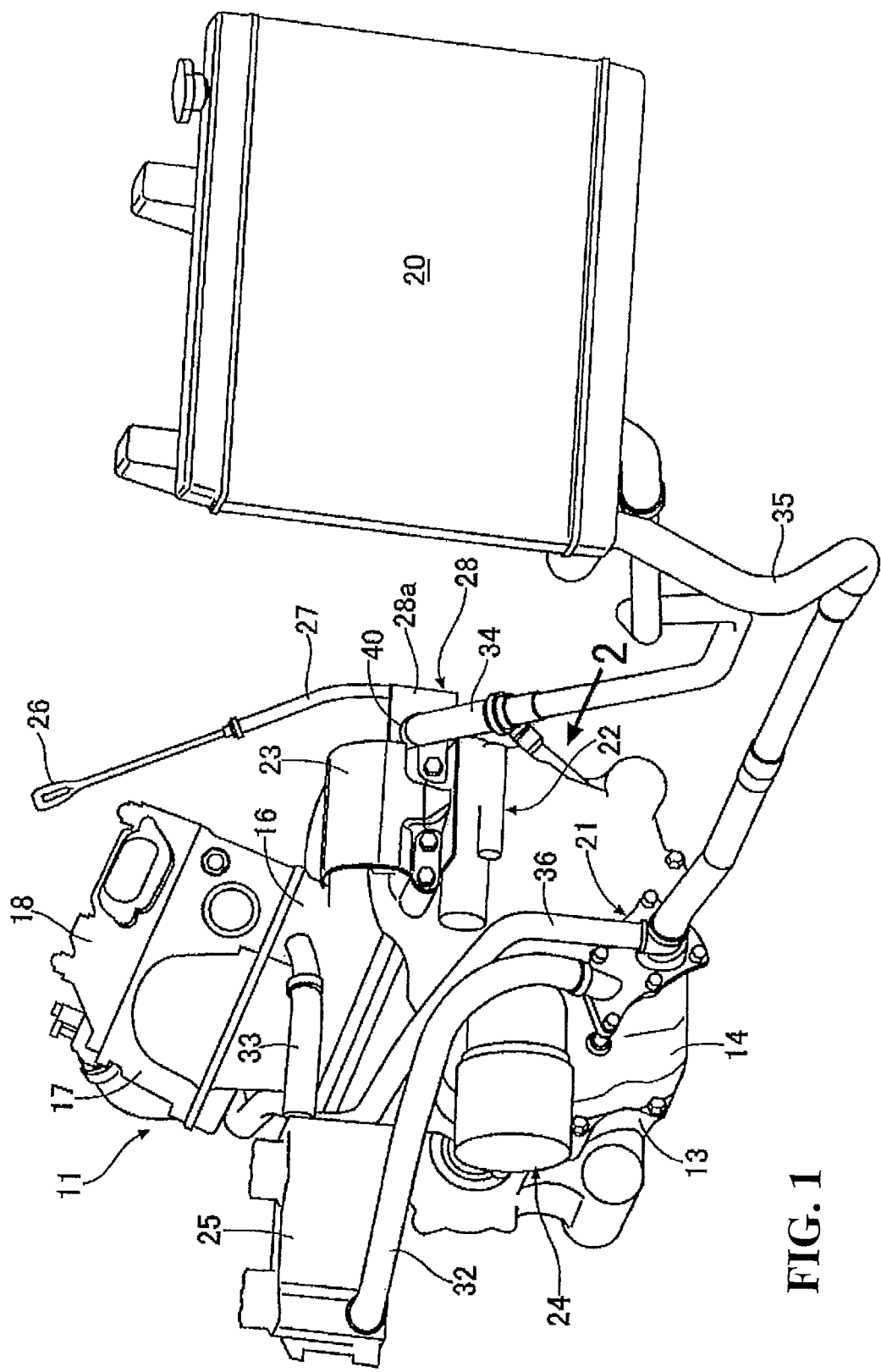
FIG. 1 is a perspective view of an internal combustion engine and a radiator as viewed from the right front side thereof.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
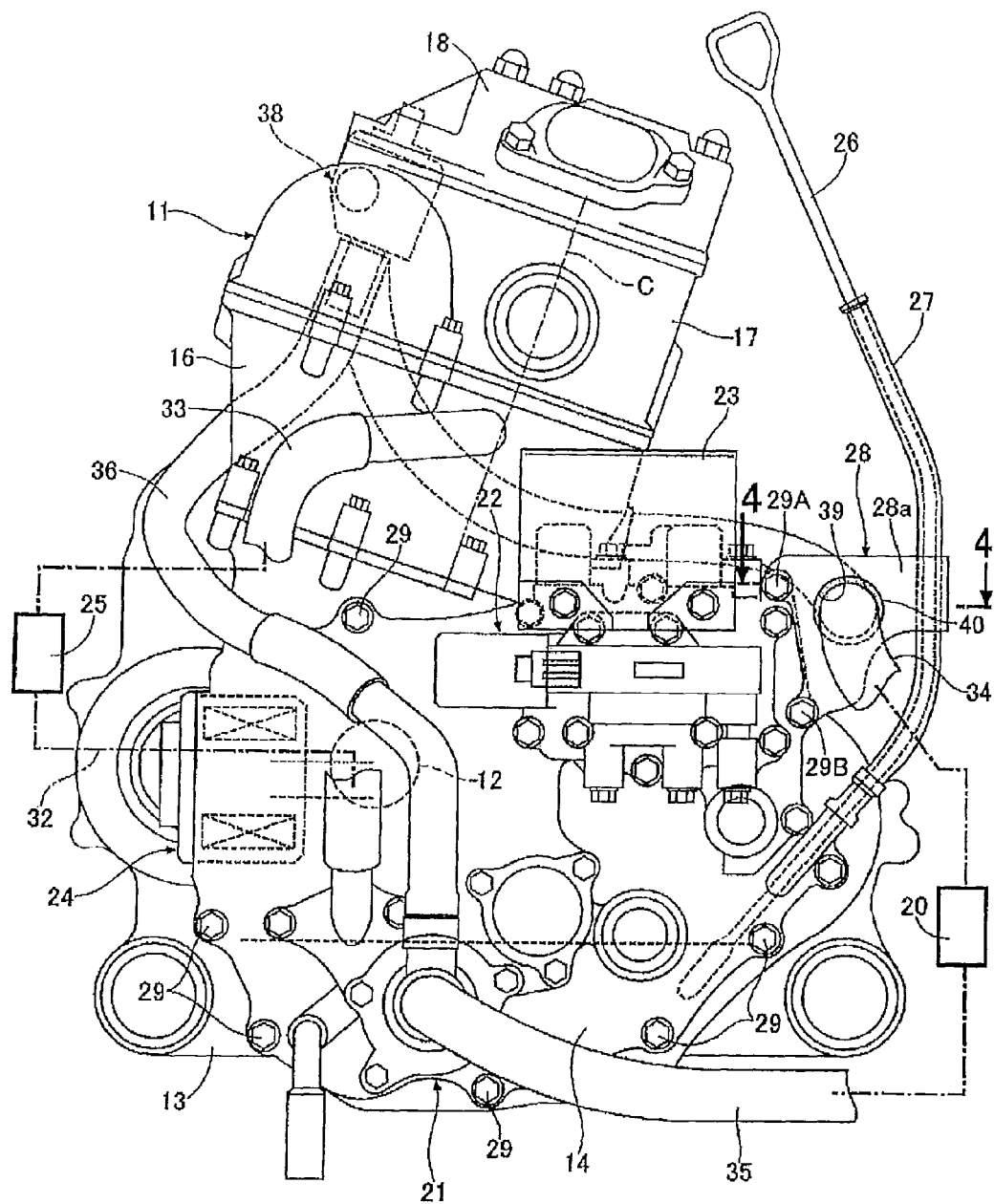
FIG. 2 is a front view taken in the direction of the arrow 2 in FIG. 1.
Figure 3:
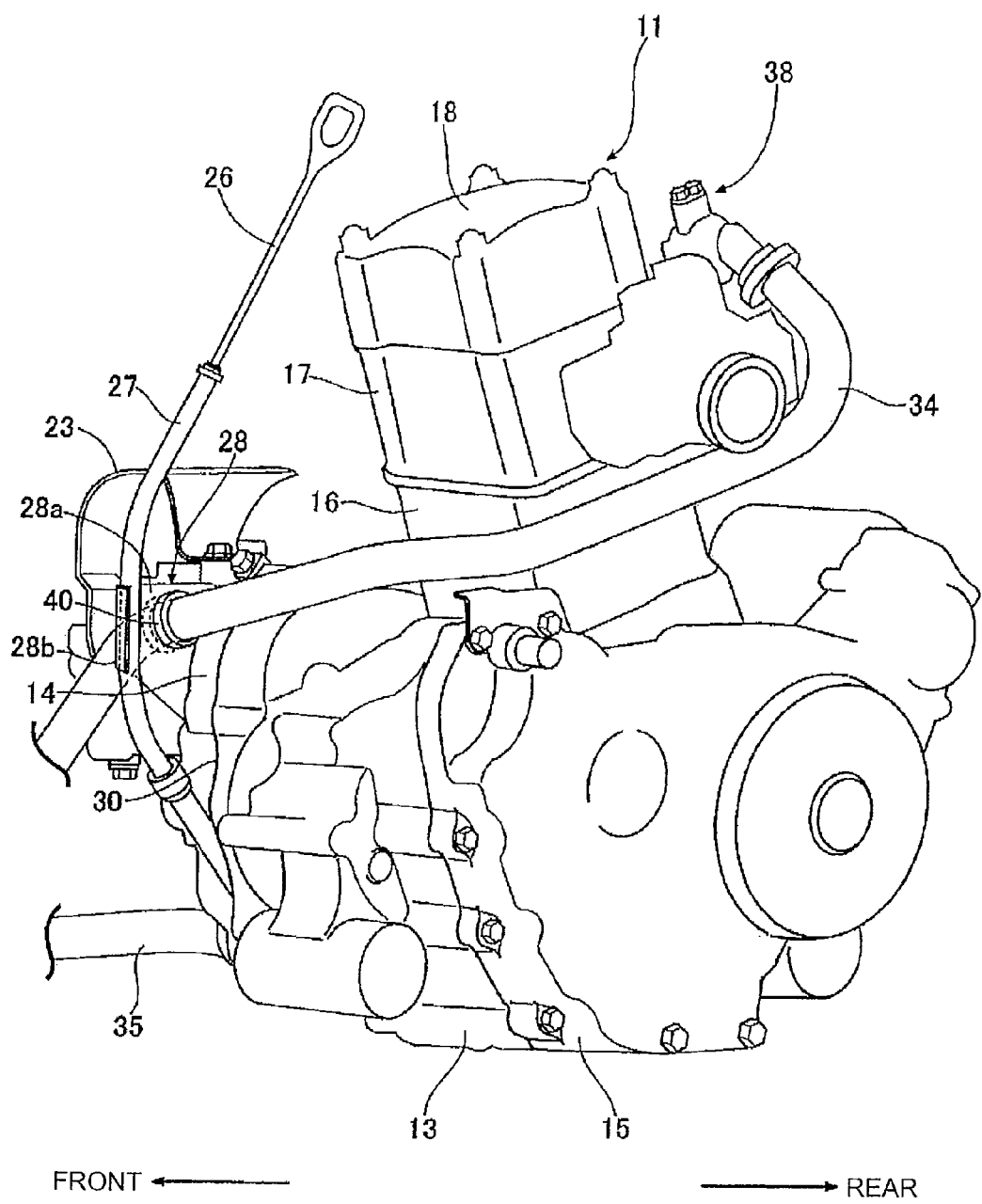
FIG. 3 is a perspective view of the internal combustion engine as viewed from the left rear side thereof.

A preferred embodiment of the present invention will now be described with reference to FIGS. 1-5. An internal combustion engine in this preferred embodiment is mounted on a saddle seat type vehicle for rough-terrain running. Referring first to FIGS. 1-3, this internal combustion engine has an engine body 11. The engine body 11 includes a crankcase 13 for rotatably supporting a crankshaft 12, a first crankcase cover 14 fastened to the crankcase 13 so as to cover one side of the crankcase 13 in a direction along the axis of the crankshaft 12, a second crankcase cover 15 fastened to the crankcase 13 so as to cover the other side of the crankcase 13 in the direction along the axis of the crankshaft 12, a cylinder block 16 connected to the upper portion of the crankcase 13 and having a cylinder axis C inclined to the left side, a cylinder head 17 connected to the upper portion of the cylinder block 16, and a head cover 18 connected to the upper portion of the cylinder head 17.

The engine body 11 is mounted to the vehicle in such a manner that the first crankcase cover 14 constitutes a part of the front surface of the engine body 11, the second crankcase cover 15 constitutes a part of the rear surface of the engine body 11, and the axis of the crankshaft 12 extends in the longitudinal direction of the vehicle. Further, a radiator 20 is located on the front side of the engine body 11.

A water pump 21 to be driven by the power transmitted from the crankshaft 12 is provided at the lower portion of the first crankcase cover 14. A hydraulic control device 22 for controlling the engagement and disengagement of a clutch (not shown) contained in the first crankcase cover 14 is provided at the upper portion of the first crankcase cover 14. A protective cover 23 for covering the upper portion of the hydraulic control device 22 is fastened to the front surface of the first crankcase cover 14. An oil filter 24 is provided at the right side portion of the first crankcase cover 14. An oil cooler 25 is located on the right side of the engine body 11. An oil pump (not shown) is located coaxially with the water pump 21 and is rotationally driven with the water pump 21 by the power transmitted from the crankshaft 12. Oil is supplied from the oil pump to the oil filter 24 and next sent from the oil filter 24 to the oil cooler 25.

An oil level gauge 26 for detecting the amount of oil stored in the lower portion of the crankcase 13 is inserted through a cylindrical oil level gauge guide 27. The oil level gauge guide 27 extends vertically on the left side of the engine body 11, and the lower end portion of the oil level gauge guide 27 is mounted on the engine body 11. The intermediate portion of the oil level gauge guide 27 is supported by a stay 28.

The outer circumferential portion of the first crankcase cover 14 is mounted to the crankcase 13 by a plurality of bolts 29, 29A, and 29B. The stay 28 is mounted to the crankcase 13 and the first crankcase cover 14 by at least two bolts 29A and 29B of the above-mentioned plural bolts 29, 29A, and 29B.

The oil level gauge guide 27 is provided at the left lower portion of the first crankcase cover 14 of the engine body 11 and extends upwardly on the left side of the engine body 11 at a position substantially corresponding to a joint surface 30 between the crankcase 13 and the first crankcase cover 14. Further, the stay 28 is mounted to the crankcase 13 and the left side of the first crankcase cover 14 by at least two bolts 29A and 29B of the plural bolts 29, 29A, and 29B fastening the first crankcase cover 14 to the crankcase 13. The at least two bolts 29A and 29B are arranged adjacent to each other in the vertical direction. In this preferred embodiment, the stay 28 is mounted to the crankcase 13 and the first crankcase cover 14 by the two bolts 29A and 29B.

Figure 4:
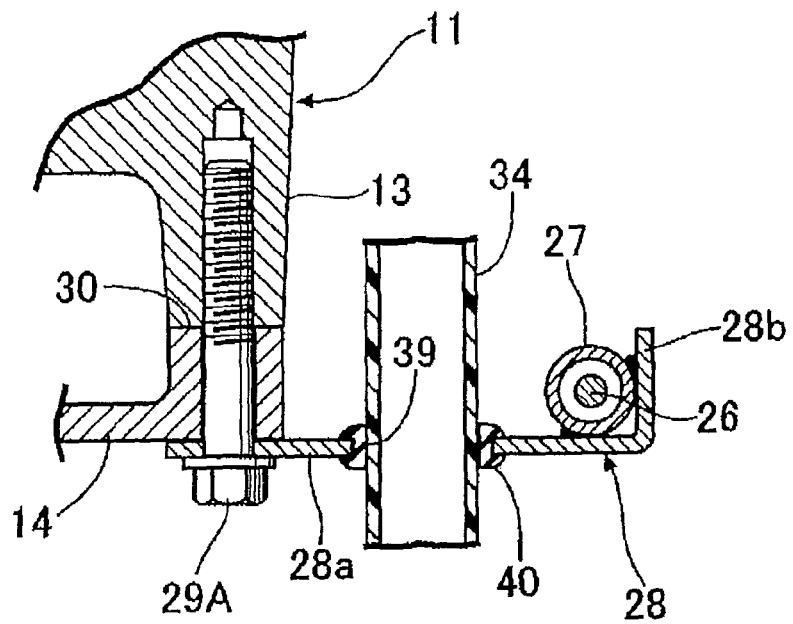
FIG. 4 is an enlarged sectional view taken along the line 4-4 in FIG. 2.

Referring to FIG. 4, at least a part of the stay 28 is formed by a support portion 28a extending in a plane perpendicular to the longitudinal direction of the vehicle. In this preferred embodiment, the stay 28 includes the support portion 28a extending in a plane perpendicular to the longitudinal direction of the vehicle and having a laterally inner end portion mounted on the first crankcase cover 14 by inserting the two bolts 29A and 29B. The stay 28 further includes a bent portion 28b extending rearward from the laterally outer end of the support portion 28a at a right angle thereto. The stay 28 is formed by bending a metal plate, so that the support portion 28a and the bent portion 28b are integral with each other. The laterally inner end portion of the support portion 28a abuts against the front surface of the first crankcase cover 14 and is mounted on the front surface of the first crankcase cover 14 by screwing the two bolts 29A and 29B into the crankcase 13 and the first crankcase cover 14. Further, the oil level gauge guide 27 is fixed to the stay 28 by welding, for example, near a connected portion between the support portion 28a and the bent portion 28b.

Figure 5:
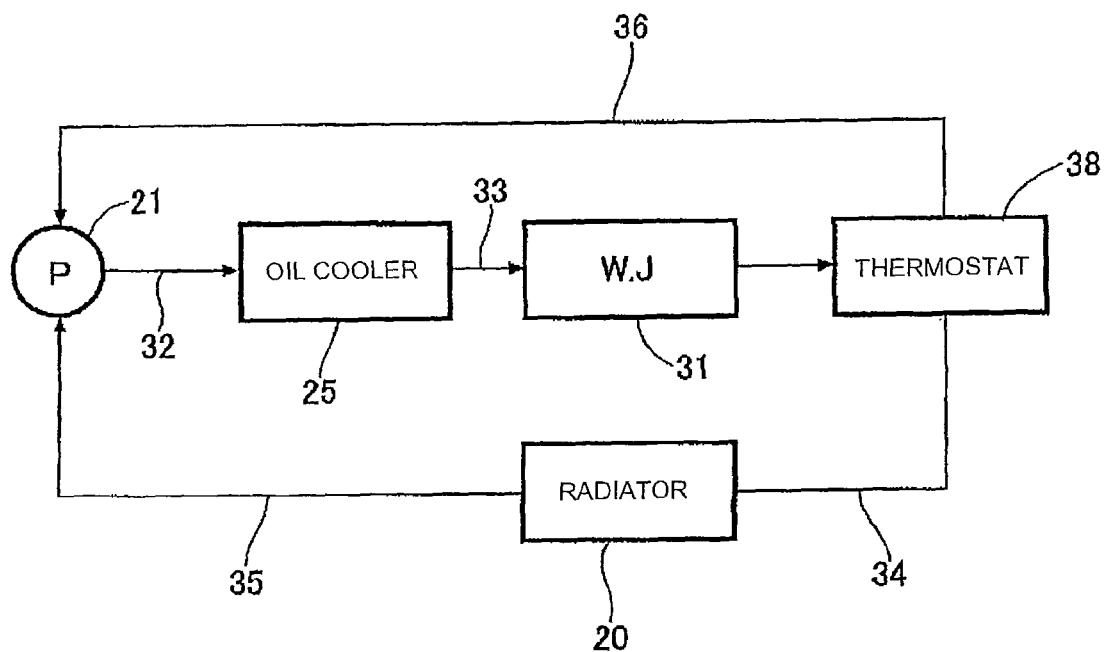
FIG. 5 is a block diagram showing a circulation path of cooling water.

Referring to FIG. 5, a water jacket 31 is provided in the cylinder block 16 and the cylinder head 17 of the engine body 11. A cooling water is discharged from the water pump 21 and sent through a first cooling water tube 32 to the oil cooler 25. The cooling water is further sent from the oil cooler 25 through a second cooling water tube 33 to the water jacket 31. The second cooling water tube 33 is connected to the cylinder block 16 of the engine body 11.

When the temperature of the cooling water sent from the water jacket 31 is high, the cooling water is sent to the radiator 20 and next returned to the water pump 21. When the temperature of the cooling water is low, the cooling water is directly returned to the water pump 21 without passing through the radiator 20. As shown in FIG. 3, a thermostat 38 is provided at the right rear portion of the cylinder head 17 of the engine body 11 for selecting the passage of the cooling water sent from the water jacket 31 to either the radiator 20 or the water pump 21 according to the temperature of the cooling water.

A third cooling water tube 34 for sending the cooling water from the thermostat 38 to the radiator 20 extends from the thermostat 38 provided at the rear portion of the engine body 11, and is curved to the left side of the engine body 11 to further extend in the longitudinal direction of the vehicle on the left side of the engine body 11. The third cooling water tube 34 is finally connected to the radiator 20. A fourth cooling water tube 35 extends from the radiator 20 to the water pump 21, so that the cooling water sent from the radiator 20 is returned to the water pump 21. Further, a fifth cooling water tube 36 for directly returning the cooling water from the thermostat 38 to the water pump 21 without passing through the radiator 20 extends from the thermostat 38 provided at the rear portion of the engine body 11, and is curved to the right side of the engine body 11 to further extend in the longitudinal direction of the vehicle on the right side of the engine body 11. The fifth cooling water tube 36 is finally connected to the water pump 21.

The stay 28 is formed with an opening 39 for insertion and support of a tube or wire. In this preferred embodiment, the support portion 28a of the stay 28 is formed with the circular opening 39 oriented in the longitudinal direction of the vehicle. A longitudinally extending portion of the third cooling water tube 34 for connecting the thermostat 38 and the radiator 20 is inserted through the opening 39 in the condition where a cylindrical elastic member 40 is interposed between the outer surface of the third cooling water tube 34 and the inner surface of the opening 39.

The operation of this preferred embodiment will now be described. The first crankcase cover 14 for covering one side of the crankcase 13 for rotatably supporting the crankshaft 12 is fastened to the crankcase 13 by the plural bolts 29, 29A, and 29B, and the stay 28 for supporting the oil level gauge guide 27 is formed with the opening 39 for insertion and support of a tube or wire. Accordingly, any dedicated supporting member for supporting a tube or wire is not required, thereby contributing to a reduction in parts count.

The stay 28 is mounted to the crankcase 13 and the first crankcase cover 14 by utilizing at least two bolts 29A and 29B of the plural bolts 29, 29A, and 29B. Accordingly, any dedicated bolts for mounting the stay 28 are not required, thereby contributing to a reduction in parts count and manufacturing cost. Further, the stay 28 can be mounted to the crankcase 13 and the first crankcase cover 14 without an increase in weight. In addition, since the stay 28 is mounted by using at least two bolts 29A and 29B, a supporting strength for the stay 28 can be sufficiently ensured.

The at least two bolts 29A and 29B for fastening the stay 28 are arranged adjacent to each other in the vertical direction. Accordingly, the stay 28 can be arranged so as to extend in the vertical direction and a sufficient supporting strength for the stay 28 can be ensured. As a result, the oil level gauge guide 27 extending in the vertical direction can be easily supported by the stay 28.

The radiator 20 is located on the front side of the engine body 11 arranged so that the axis of the crankshaft 12 extends in the longitudinal direction of the vehicle. The support portion 28a forming at least a part of the stay 28 and extending in a plane perpendicular to the longitudinal direction of the vehicle is formed with the opening 39 oriented in the longitudinal direction of the vehicle. The third cooling water tube 34 extending in the longitudinal direction of the vehicle and connected to the radiator 20 is inserted through the opening 39. Accordingly, any dedicated parts for supporting the third cooling water tube 34 are not required, thereby contributing to a reduction in parts count, and the third cooling water tube 34 can be efficiently supported.

The oil level gauge guide 27 is provided on the first crankcase cover 14 constituting a part of the front surface of the engine body 11, and the thermostat 38 is provided at the rear portion of the engine body 11. One end of the third cooling water tube 34 is connected to the thermostat 38. Accordingly, the third cooling water tube 34 minimized in length can be efficiently supported by the stay 28.

The oil level gauge guide 27 extends at a position substantially corresponding to the joint surface 30 between the first crankcase cover 14 and the crankcase 13. Accordingly, the oil level gauge guide 27 can be located near the stay 28 mounted to the crankcase 13 and the first crankcase cover 14.

The oil level gauge guide 27 is provided on the first crankcase cover 14. Accordingly, the stay 28 mounted to the first crankcase cover 14 and the crankcase 13 can be lapped over the oil level gauge guide 27 in the axial direction of the crankshaft 12, and the stay 28 can be formed as a flat member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine comprising:
    an engine body including:
        a crankcase for rotatably supporting a crankshaft; and
        a crankcase cover fastened to the crankcase by a plurality of bolts so as to cover one side of the crankcase; and
    a stay supporting an oil level gauge guide, the stay being mounted on the engine body, the stay having a first through hole having a longitudinal axis along a thickness direction of the stay and a second through hole having a longitudinal axis along the thickness direction of the stay, the longitudinal axis of the first through hole and the longitudinal axis of the second through hole being parallel, a tube passing through the first through hole and being supported by the stay, one of the plurality of bolts that mounts the stay to the engine body passing through the second through hole.

2. The internal combustion engine according to claim 1, wherein the stay is mounted to the crankcase and the crankcase cover by at least two of the plurality of bolts.

3. The internal combustion engine according to claim 2, wherein the at least two bolts for fastening the stay are arranged adjacent to each other in a vertical direction.

4. The internal combustion engine according to claim 3, wherein the oil level gauge guide extends at a position substantially corresponding to a joint surface between the crankcase cover and the crankcase.

5. The internal combustion engine according to claim 4, wherein the oil level gauge guide is provided on the crankcase cover.

6. The internal combustion engine according to claim 5, wherein:
    a radiator is located on a front side of the engine body and an axis of the crankshaft extends in a longitudinal direction of a vehicle including the internal combustion engine;
    a support portion of the stay extends in a plane perpendicular to the longitudinal direction of the vehicle and is formed with the first through hole oriented in the longitudinal direction of the vehicle; and the tube extending in the longitudinal direction of the vehicle and sending cooling water to the radiator is inserted through and supported by the first through hole.

7. The internal combustion engine according to claim 6, wherein:
the oil level gauge guide is provided on the crankcase cover, and the crankcase cover constitutes a part of a front surface of the engine body; and
a thermostat is provided at a rear portion of the engine body and one end of the tube is connected to the thermostat.

8. The internal combustion engine according to claim 1, wherein the oil level gauge guide extends at a position substantially corresponding to a joint surface between the crankcase cover and the crankcase.

9. The internal combustion engine according to claim 1, wherein the oil level gauge guide is provided on the crankcase cover.

10. The internal combustion engine according to claim 1, wherein:
a radiator is located on a front side of the engine body and an axis of the crankshaft extends in a longitudinal direction of a vehicle including the internal combustion engine;
a support portion of the stay extends in a plane perpendicular to the longitudinal direction of the vehicle and is formed with the first through hole oriented in the longitudinal direction of the vehicle; and
the tube extending in the longitudinal direction of the vehicle and sending cooling water to the radiator is inserted through and supported by the first through hole.

11. The internal combustion engine according to claim 1, wherein:
the oil level gauge guide is provided on the crankcase cover and the crankcase cover constitutes a part of a front surface of the engine body; and
a thermostat is provided at a rear portion of the engine body and one end of the tube is connected to the thermostat.

12. The internal combustion engine according to claim 1, wherein the stay includes a support portion and a bent portion substantially perpendicular to and joining the support portion, and the first through hole is located at the support portion.

13. The internal combustion engine according to claim 1, wherein the first through hole and the second through hole are through a plate of the stay, the plate extends in a plane perpendicular to a longitudinal direction of a vehicle including the internal combustion engine, and a cylindrical elastic member surrounds a circumference of the first through hole and is interposed between an outer surface of the tube and the circumference of the first through hole.

14. An internal combustion engine comprising:
an engine body including:
a crankcase for rotatably supporting a crankshaft; and
a crankcase cover fastened to the crankcase and covering one side of the crankcase;
an oil level gauge guide;
a cooling water tube circulating cooling water to cool the internal combustion engine; and
a stay mounted on the engine body and supporting the oil level gauge guide, the stay having a first through hole having a longitudinal axis along a thickness direction of the stay and a second through hole having a longitudinal axis along the thickness direction of the stay, the longitudinal axis of the first through hole and the longitudinal axis of the second through hole being parallel, the cooling water tube passing through the first through hole and being supported by the stay, a bolt that mounts the stay to the engine body passing through the second through hole.

15. The internal combustion engine according to claim 14, wherein the crankcase cover is fastened to the crankcase by a plurality of bolts that include the bolt, and the stay is mounted to the crankcase and the crankcase cover by at least two of the plurality of bolts that include the bolt.

16. The internal combustion engine according to claim 14, wherein the stay is in contact with the crankcase cover, and the crankcase cover is sandwiched between the stay and the crankcase.

17. The internal combustion engine according to claim 14, wherein the stay extends in a direction perpendicular to a longitudinal direction of a vehicle having the internal combustion engine.

18. The internal combustion engine according to claim 14, wherein the crankcase cover constitutes a part of a front surface of the engine body, a thermostat is located at a rear portion of the engine body, and one end of the cooling water tube is connected to the thermostat.

19. The internal combustion engine according to claim 14, wherein the stay includes a support portion and a bent portion substantially perpendicular to and joining the support portion, and the first through hole is located at the support portion.

20. The internal combustion engine according to claim 14, wherein the first through hole and the second through hole are through a plate of the stay, the plate extends in a plane perpendicular to a longitudinal direction of a vehicle including the internal combustion engine, and a cylindrical elastic member surrounds a circumference of the first through hole and is interposed between an outer surface of the tube and the circumference of the first through hole.

* * * * *